I. R. Lawrence,
Horse Power.
N° 36,353.   Patented Sep. 2, 1862.
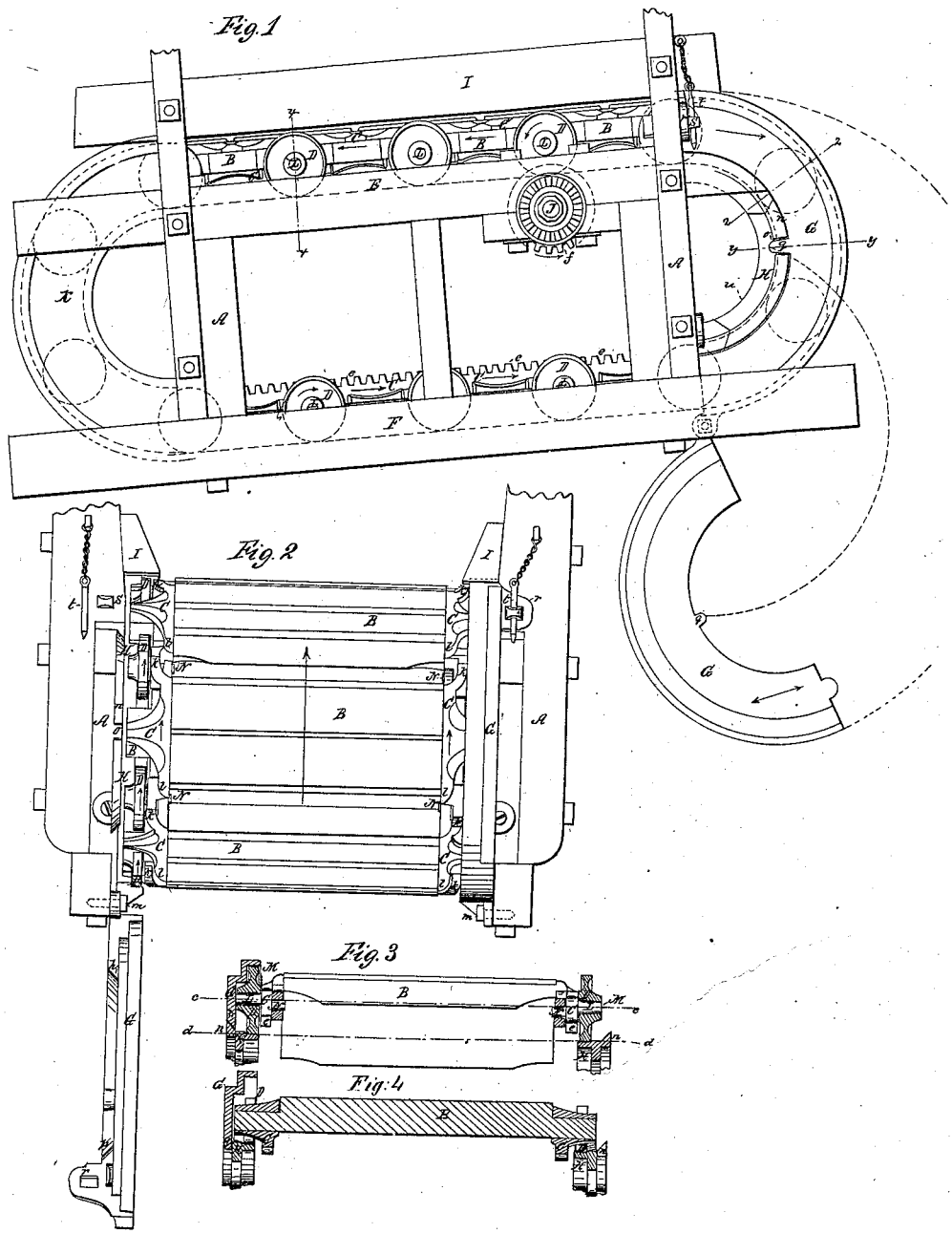
Witnesses:
Charles A. Briggs
Austin F. Park
Inventor:
Isaac R. Lawrence

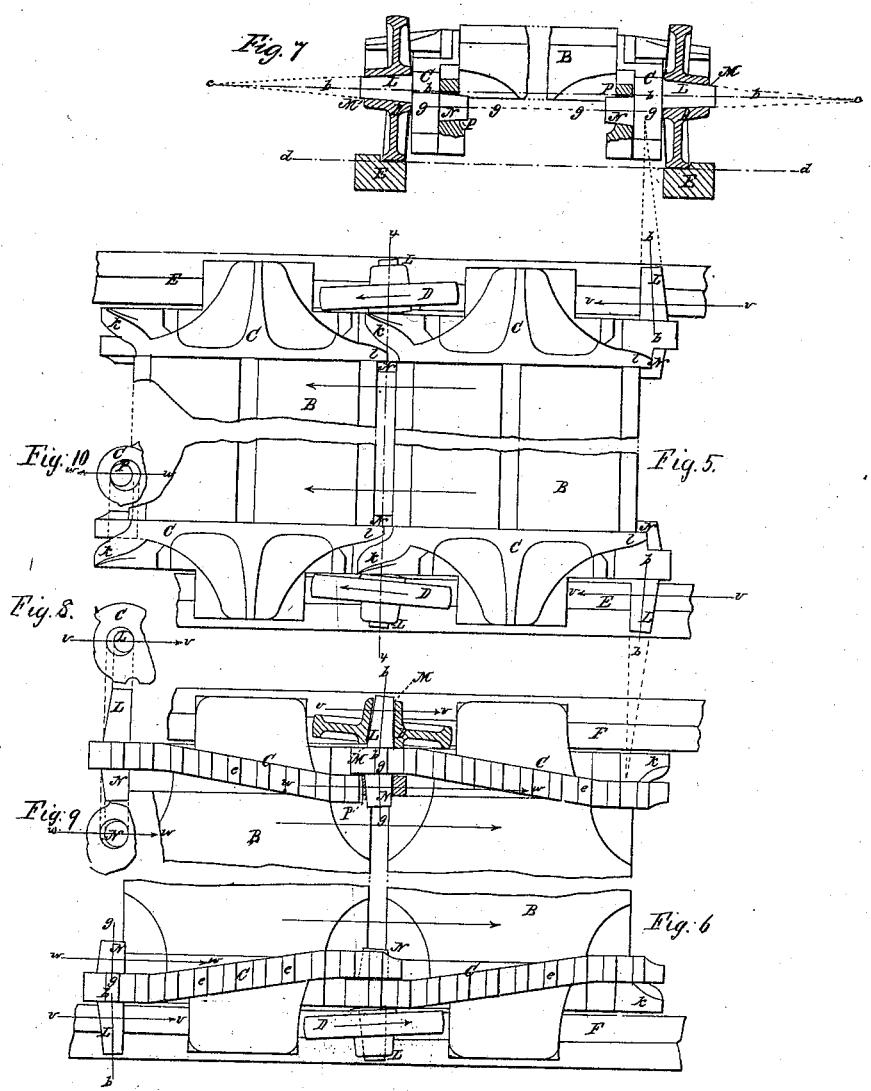

UNITED STATES PATENT OFFICE.

ISAAC R. LAWRENCE, OF GREEN ISLAND, NEW YORK.

IMPROVEMENT IN ENDLESS-CHAIN HORSE-POWERS.

Specification forming part of Letters Patent No. 36,353, dated September 2, 1862.

*To all whom it may concern:*

Be it known that I, ISAAC R. LAWRENCE, of the village of Green Island, in the county of Albany and State of New York, have invented certain new and useful Improvements in Endless-Chain Horse-Power Machines, of which the following is a full and exact description, reference being had to the annexed drawings, in which—

Figure 1 is a side elevation, and Fig. 2 a front view, of the main portion of a horse-power machine embodying my invention; and Fig. 3 is a section of a part of the same machine at the line $z\,z$, and Fig. 4 is another section of the same part at the line $y\,y$. Fig. 5 is a top view of a part of the upper stretch; Fig. 6, a top view, partly in section, of a part of the lower stretch; and Fig. 7, a cross-section at or about the line $x\,x$, all of the endless chain and track of the same machine, but shown on a larger scale than in the other drawings. Figs. 8, 9, and 10 are side elevations of parts of the links of the same endless chain.

The same letters refer to like parts in all the figures, and the arrows therein indicate the directions in which the parts move.

In the annexed drawings, A is the stationary or supporting frame of the machine.

B B are the lags for the horse or horses to tread upon, C C the links which connect the lags together, and D the carrying wheels or rollers of the endless chain.

E E are the two upper and F F the two lower track-rails on which the rollers D of the endless chain run, and G, H, and K are the inner and outer curved guides or ways in which the chain runs between the ends of the track-rails.

I I are the guard-rails which keep the endless chain down in place while passing along the upper track-rails, E E, where the chain receives the tread of the horse or horses, and where the chain engages, by means of teeth $e$ on the links, with a toothed pinion, $f$, on a shaft, J, arranged to receive and communicate rotary motion from the endless chain.

In running endless-chain horse-powers it often happens that a roller, D, link C, or lag B becomes broken, worn out, or in some way defective before the others, and must be taken out of the chain and a new one put in its place; but in endless-chain horse-powers made before my invention herein described the least difficult or only practicable mode known to me of removing a lag, link, or roller from the endless chain was to take the horse or horses off from the machine and unfasten and remove one or both of the guard-rails I I, and then lift and bend up the chain until the roller, link, or lag could be slid out over the upper track-rail. Such taking out and putting in of the horse or horses and taking off and reattaching of the guard-rails and lifting and holding up of the chain required hard work and much loss of time of the attendants when the horse-power and the machinery driven thereby should be running, and in reattaching the guard-rails I the unskilled laborers, who are generally employed to use horse-powers, were very liable to set the guard-rails so as to make the rollers D bind and the chain run hard, or not properly or accurately engage with the pinion $f$ on the shaft J. Besides, when the links C C had lugs $k\,l$, Figs. 2, 5, and 6, which locked the links together while running on the straight track-rails, it was very objectionable, if not impracticable, to have the chain so loose as to let it be bent up far enough to allow the lugs $k\,l$ to separate, so as to permit the links to be taken off from the lags B when over the upper track-rails, E E. Now the lateral or outer guide, G, Figs. 1, 2, 3, 4, is necessary to keep the endless chain or parts thereof properly together and in place while passing from one pair of track-rails to the other around the inner curved guide, H, and the outer guide, G, has heretofore been made in one piece, with the inner guide, H, as shown at K in Fig. 1, or fixed immovably in respect to the endless chain, while the latter remained entire and in place for running in the machine; but I make the outer guide, G, readily removable from the inner guide, H, or its equivalent, and away from the endless chain, while the latter remains entire and in place on the inner guides, H, or on the reel, which has often been arranged in endless-chain horse-powers in the place of the inner guide, H, and so construct and arrange the frame A and the other parts of the machine that an attendant, after removing the outer guide, G, or guides G G, Fig. 2, away from the endless chain, and making fast the latter, can then, without removing either the guard-rail or guard-rails I I, or the horse or horses, from the machine, take out of and insert in the endless chain any roller D, link C, or lag B, at the end of the machine where he has taken off the outer guide or guides, G, at which place the attendant can more conveniently handle the links and lags than at the sides of the machine over the upper track-rails. And at the end of the machine the links C are so bent around or upon the inner guide, H, or its equivalent, as to be free to be slid sidewise off from the lags when the links have lugs $k\,l$, as shown in Figs. 2, 5, and 6, to lock the links together when on the straight track-rails; and by thus having the outer guide, G, removable, and changing the links and lags of the chain at the end of the machine without loosening or moving the guard-rail I, there is in thus changing the lags and links no liability of disarranging the proper engagement of the rack-teeth $e$ of the links with the pinion-teeth $f$, Fig. 1, on the driven shaft J, placed under the guard-rails.

I fasten the removable guide or guides G to the frame of the machine in any suitable manner—for instance, in the machine shown by the annexed drawings the outer guides, G G, at the front end of the machine, are hung on pivot-bolts $m$ to the frame A below the endless chain, and when keeping the chain in place on the inner guides, H H, as shown at the right hand in Fig. 2 and at the left hand in Figs. 3 and 4, the outer guide, G, is then held in place by means of a flange, $n$, and recess $o$, on the frame or inner guide, H; a flange, $p$, and tongue $q$, and hasp $r$, on the guide G; a perforated lug or staple, $s$, on the frame A, and a removable pin, $t$; so that by just taking the pin $t$ from the staple $s$ the outer guide, G, can then be freely turned down on the pivot $m$, as a center, away from the endless chain, so as to leave the rollers, links, and lags exposed and free to be taken from the machine, as shown at the left hand in Fig. 2 and at the right hand in Figs. 3 and 4. Instead of having the entire outer guide or guides, G, removable, only such a part thereof need be made removable as will allow the lags, links, and rollers to be changed at the end of the machine, and the outer guide or guides, G, or a sufficient part thereof, as just stated, may be made removable at either the front or the back end, or at both ends, of the machine, and the inner curved guides, H, may each be made in one immovable piece, or a part, $u$, Fig. 1, may be made separable laterally, or so as to slacken the chain in changing its links and lags. When the axles L, which carry the rollers D, are cast in one piece with the links C, those axles should be made tapering in order that they may have greater strength with less size and at the same time allow the axles and the corresponding tapered sockets M in the rollers D to be molded and cast with less difficulty than cylindrical axles and sockets.

Tapered axles have been heretofore cast on the links of endless-chain horse-power machines, with the central or axial lines, $b\,b$, Figs. 5, 6, and 7, of the axles in a plane, $c\,c$, Fig. 7, essentially parallel to the plane $d\,d$ of the track, but substantially perpendicular to the lines of motion $v\,v$, Figs. 5 and 6, of the axles, so that the rollers D D in running would tend to run off from the tapered axles and rub and bind against the track-rails, whether running on the upper or the lower track. Now, to avoid that difficulty, I cast the tapered axles L L on the links C C with the central lines, $b\,b$, of the axles parallel or substantially parallel to the plane of the track, but inclined forward toward the line or direction of motion $v\,v$ of the axles, as is clearly shown by Figs. 5, 6, 7, and 8 of the annexed drawings, so as to thereby make the rollers D tend to keep on the axles L L, as well when the chain is running bottom-side up on the lower track-rails, F F, Figs. 1 and 6, as when running right-side up on the upper track-rails, E E, Figs. 1, 5, and 7.

For the sake of more clearly illustrating this part of my invention, I have in Figs. 5, 6, and 8 shown the tapered axles L L inclined forward about twice as much as, or somewhat more than, will generally be necessary with axles of the taper shown in the drawings, to keep the rollers D properly on the axles when running either side up; and I will here remark that it is essential to this part of my invention that the tapered axles L L should be substantially parallel to the plane $d\,d$, Figs. 7 and 3, of the track they are passing along, as well as that the axles should be inclined forward toward their line or direction of motion, as shown by Figs. 5, 6, and 8, for if the axles L were inclined downward or toward the plane of the track while passing along the upper track, E E, the same axles would be inclined upward or away from the plane of the track when moving along the lower track, F F, and consequently make the rollers D more liable to run off from their axles L.

Whenever the links of endless chains for horse-powers are jointed together by means of pivots N and corresponding sockets P, Figs. 6, 7, and 10, cast in and upon the links, it is very important that the pivots and sockets should be tapered, so as to secure the most strength with the least size and at the same time allow them to be molded and cast with the least difficulty; but in endless chains for horse-power machines, heretofore made with the links jointed together by the use of tapered pivots cast on the links, the axial or central lines, $g\,g$, of the pivots were arranged substantially perpendicular to the line of motion $w\,w$, Figs. 5 and 6, of the pivots, so that the taper of the pivots tended to make the links slide apart sidewise on the pivots under the pull of the horse or horses on the running chain.

To lessen or remedy that difficulty, I arrange the tapered pivots N and their corresponding sockets P, by which the links C are jointed together, with the axial or middle lines, $g\,g$, of the pivots and sockets inclined toward the line of motion $w\,w$ of the pivots, essentially as shown by Figs. 5, 6, 7, and 9 of the annexed drawings. When the pivots N are cast on the back part of the links C, as shown in Figs. 5 and 6, the pivots must then incline forward toward the line of motion $w\,w$ of the pivots; but if the pivots N were cast on the forward part of the links the pivots would in such a case require to be inclined backward toward their line of motion.

Now, what I claim as new and of my invention in endless-chain horse-power machines, and desire to secure by Letters Patent, is—

1. The movable half-circle or outside guide or guides, G, for the endless chain at the end of the machine, the machine being so constructed, substantially as herein described, that a lag, B, link C, or roller D can be taken from and replaced in the endless chain at the circular end of the machine on removing the said half-circle or outer guide or guides, G, without taking either the guard-rail or guard-rails I, or the horse or horses, from the machine.

2. The inclined tapered axles L, cast on links C, combined together and with the rollers D, lags B, and tracks E F, substantially as herein described.

3. The inclined tapered pivots N and corresponding sockets P, cast in and upon links C, combined together and with lags B, rollers D, and supporting rails E F, substantially as herein described.

ISAAC R. LAWRENCE.

Witnesses:
CHARLES A. BRIGGS,
AUSTIN F. PARK.